//

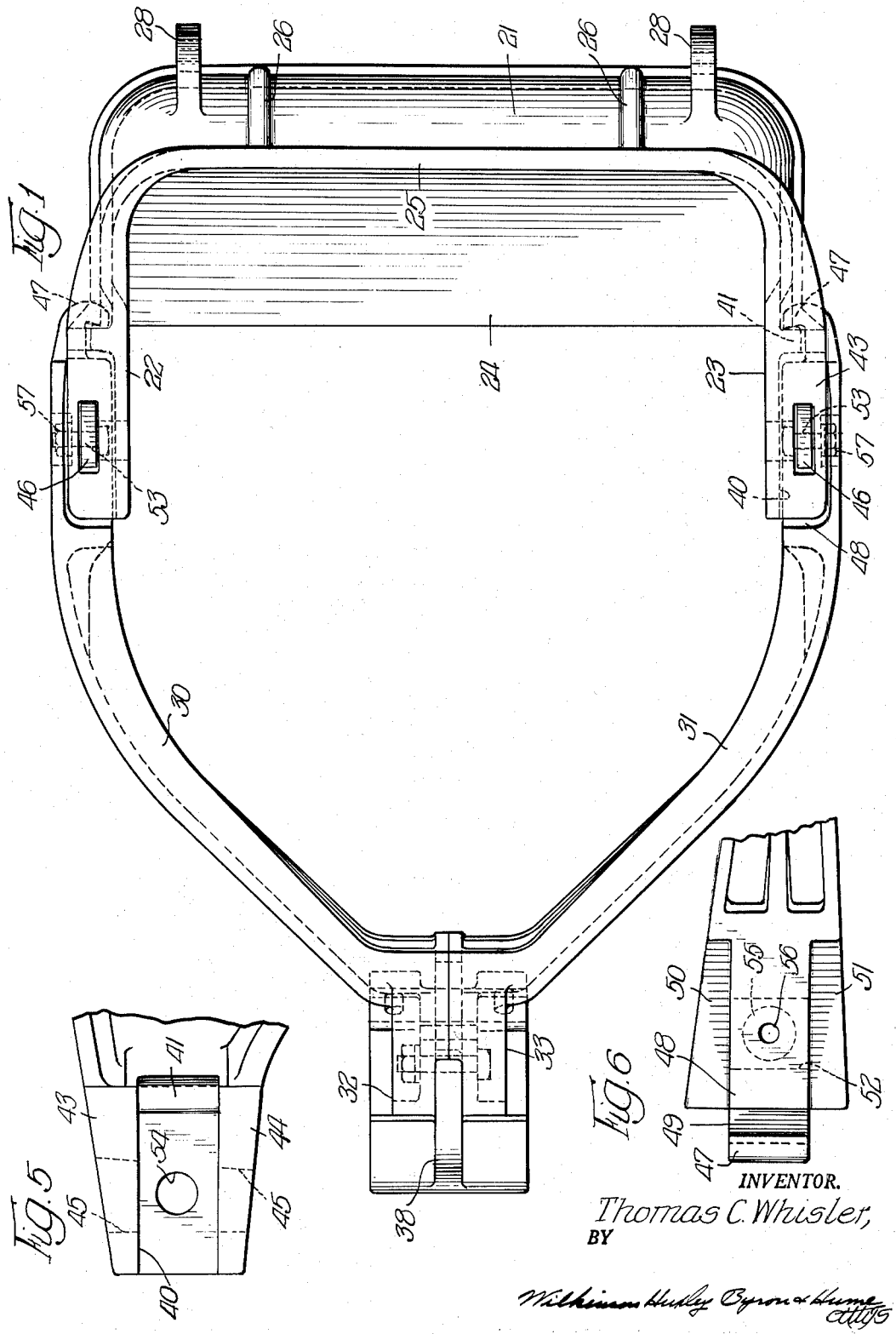

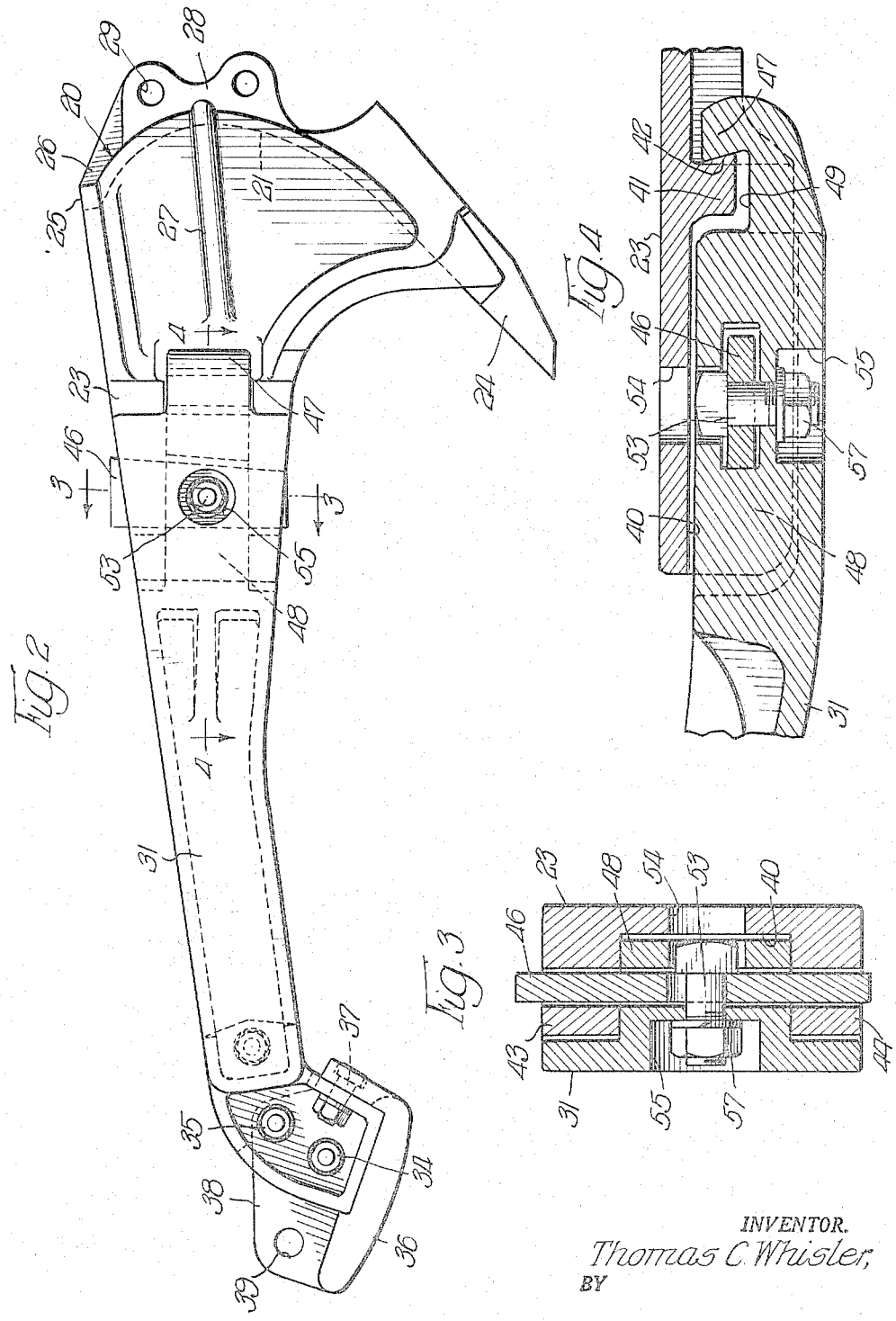

United States Patent Office 2,743,540
Patented May 1, 1956

2,743,540

SLUSHING SCRAPER WITH DETACHABLE BAIL ARMS

Thomas C. Whisler, Alameda, Calif., assignor to American Brake Shoe Company, New York, N. Y., a corporation of Delaware Application February 14, 1952, Serial No. 271,549

6 Claims. (Cl. 37—147)

The invention relates generally to scraper buckets with more particular reference to such buckets of the drag-line type and has for an object to provide a portable scraper with detachable bail arms so that the bucket with the bail arms detached therefrom can be conveniently transported and then assembled at the location where the scraper will be used.

A further object is to provide a slushing scraper of special design incorporating bail arm connecting structure which will render the scraper portable when in dismantled condition but which can be readily assembled after having reached a destination such as an underground coal mine or the like, and which can also be held in assembled relation by the insertion of certain wedges for locking the bail arms to the body of the scraper.

A more specific object of the invention resides in the provision of novel and improved locking means for locking the detachable bail arms to the body portion of the scraper and which locking means will essentially consist of interfitting portions on the scraper body and arms, respectively, designed to receive a wedge that can be held in place by being bolted to its respective bail arm.

Another object is to provide a slushing scraper having separable bail arms provided with structure interfitting with and locking with complementary structure on the scraper body. An additional feature in combination therewith resides in the provision of a hook connection whereby each bail arm may engage the scraper body so that the interfitting and interlocking structure between the scraper body and bail arms is relieved of excessive strains and stresses which would otherwise be applied thereto during digging operations.

A further object of the invention is to provide a novel slushing scraper of improved design and characterized by separable bail arms, a slushing scraper which will embody few parts of simple construction, and which will be rugged and durable in operation.

With these and various other objects in view, the invention may consist of certain novel features of construction and operation as will be more fully described and particularly pointed out in the specification, drawings and claims appended thereto.

In the drawings which illustrate an embodiment of the invention, and wherein like reference characters are used to designate like parts—

Figure 1 is a plan view of a slushing scraper embodying the improved features of the present invention;

Figure 2 is a side elevational view of the scraper of Figure 1 showing more particularly the connecting structure between scraper body and each bail arm;

Figure 3 is a vertical transverse sectional view on line 3—3 of Figure 2 showing in detail the connecting structure and illustrating the means for locking a bail arm to the scraper body by means of a wedge;

Figure 4 is a horizontal tranverse sectional view on line 4—4 of Figure 2, further illustrating in detail the same structure as shown in Figure 3;

Figure 5 is a fragmentary elevational view of a side arm portion of the scraper body with the bail arm removed; and Figure 6 is a fragmentary elevational view looking at the inside wall of a bail arm at the hook end thereof.

The slushing scraper selected for illustrating the present invention is of the drag-line type having means for connecting a drag-line to the forward terminal end of the connected bail arms and to the rear of the back wall of the scraper. In other words, the scraper bucket is interposed in the drag-line so that a pull on the same in one direction will cause forward digging movement of the scraper bucket, whereas, a pull on the line in a reverse direction will return the bucket to its initial starting position. In order to facilitate transportation of a drag-line scraper as described to work locations such as coal mines and the like the invention contemplates the provision of detachable bail arms and which may be keyed and bolted to the body of the scraper by interfitting and interlocking structure.

Referring to the drawings, particularly Figures 1 and 2, the body portion 20 of the scraper is of one-piece construction substantially U-shape in top plan, having a back wall 21, side arm portions 22 and 23, and a scraper blade or lip portion 24. The back wall 21 is arcuate, being almost semi-circular in transverse section. The top edge of the back wall may comprise the reinforced top bead 25 which merges into the side arms on respective sides of the scraper. In a downward direction the top bead 25 merges into the back wall 21 and which back wall is suitably thickened and reinforced along the bottom terminal portion thereof to comprise the digging lip 24, which constitutes the working edge of the scraper. On its rear surface the back wall is suitably reinforced by the vertical and horizontal reinforcing ribs 26 and 27, respectively, and rear drag-line hitches 28 are formed integral with the back wall on the rear surface thereof in spaced relation as best illustrated by Figure 1. Each rear hitch 28 is provided with a pair of openings such as 29 for receiving a drag-line, cable or the like, by means of which the same may be attached to the bucket.

The bail arms 30 and 31 have releasable connection with the body portion of the scraper by interfitting and interlocking structure which will be presently described in detail. The arms project forwardly of the scraper body and are bent inwardly, having a special formation 32 and 33 at their terminal ends, which engage each other and interfit to form the forward drag-line hitch for the scraper bucket. The formation at the forward end of each arm may be held in connected relation by securing bolts such as 34 and 35 and by the shoe 36 secured in place by bolt 37. The central web 38 is apertured at 39 to provide the opening through which a drag-line or cable may be passed for securing the same to the forward hitch.

As best shown in Figure 2, each bail arm has releasable connection with the body portion of the scraper. Accordingly, each side arm portion 22 and 23 has a special formation on the exterior surface thereof, and each of the bail arms 30 and 31 on the interior surface thereof is formed with a complementary formation whereby the bail arms have a hook connection with the scraper and are in turn locked in such connected relation therewith. The terminal end of each side arm portion 22 and 23 is formed with a horizontal centrally disposed groove 40, said groove being of considerable depth due to the ample thickness of the terminal ends of the side arm portions. The groove terminates at its right hand end, Figures 2, 4 and 5, in a raised or upstanding ledge 41 having an undercut wall 42, providing one part of the hook connection previously referred to. As a result of the central groove 40, top and bottom sections 43 and 44 are formed and which have the original thickness of the side arm portions. The sections 43 and 44 are apertured vertically to form the aligned openings 45 and which are adapted to receive the wedge 46.

Each of the bail arms 30 and 31 at the end opposite the forward drag-line hitch is formed to provide the hook 47. The hook end of each bail arm is provided with a central horizontally disposed tongue 48 having a vertical dimension slightly less than that of the groove 40 so as to be received by the groove. The tongue terminates in the hook 47 which is substantially formed by the vertical slot 49. The inner wall of the hook 47 tapers complementary to wall 42 so as to have full contact therewith to insure full and adequate connection of the hook 47 with its respective ledge 41. The formation of tongue 48 provides top and bottom recesses 50 and 51, said recesses receiving the sections 43 and 44 respectively when the parts are in assembled relation. The tongue is apertured vertically to form the opening 52 which is aligned with the openings 45 and which likewise receives wedge 46, said wedge holding its respective bail arm in proper assembled relation with its side arm portion.

In accordance with the invention the parts are locked in operative engagement by means of securing bolt 53 which is designed to secure the wedge 46 to its respective bail arm. The head of the bolt is passed through aligned openings 54 in the side arm portion and side wall of the bail arm respectively. As a result the head of the bolt is in contact with wedge 46. This structure requires that the bolt be inserted from inside the scraper bucket. The exterior surface of each bail arm portion is provided with a countersunk opening 55 substantially aligned with the tongue thereof and a second opening of smaller size, namely, 56, formed in the tongue through which passes the shank of securing bolt 53. The nut 57 accordingly has location in the countersunk opening 55 and as a result of this structure the wedge is locked in place, preventing accidental removal of the wedge such as might result in release of the hook connection of the bail arm with the scraper body.

In assembling a bail arm on its respective side arm portion of the scraper bucket the tongue 48 is located in a central groove 40 which locates the top and bottom sections 43 and 44 in the recesses 50 and 51, respectively. The hook 47 will be in contact with its respective tapered wall 42 since the action of locating the tongue in the groove automatically locates the ledge 41 in the slot 49. With the parts in assembled relation as described, the openings 45 will be aligned with opening 52. The wedge 46 is thereupon inserted in the aligned openings and by gently tapping the wedge it will be caused to contact the side walls of openings 45 and 52, securely retaining the same in place. However, in accordance with the invention, each wedge 46 is bolted to its respective bail arm. The head of the bolt actually contacts the wedge and the nut has location in the countersunk opening 55 and thus has contact with the bail arm.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a scraper bucket, in combination, a body member of one-piece construction substantially U-shaped in plan and providing a digging lip portion along the bottom edge, said body member having forwardly extending side arm portions, each side arm portion at the forward terminal end thereof having a horizontal groove in its outer wall, an upstanding ledge disposed in the groove at right angles thereto and substantially vertically of the body member, a pair of bail arms for the body member, one being disposed on each side thereof and adapted to have releasable connection with the side arm portions respectively, each bail arm at the terminal end to be connected with a side arm portion having a tongue on its inside wall and which terminates in a hook-shaped extension, whereby each bail arm is assembled with its tongue in a groove and with its hook-shaped extension in engagement with the respective upstanding ledge, each side arm portion at its forward terminal end having a vertical opening intersecting the groove therein, the said tongue on each bail arm also being provided with a vertical opening and which is so disposed that said opening aligns with the opening in its respective side arm portion when the parts are assembled, and means for locking the parts in assembled relation including a wedge adapted to be inserted in the aligned openings.

2. In a scraper bucket, in combination, a body member, a digging lip portion along the bottom edge of the body member, a forwardly extending side arm portion on each side of the body member, each side arm portion at its forward terminal end having a horizontal groove in its outer wall, said groove forming top and bottom sections characterizing the terminal end of each side arm portion, an upstanding ledge disposed in the groove at right angles thereto and located adjacent the inner end of the groove, a bail arm for connection with each side arm portion, each bail arm at the terminal end to be connected with a side arm portion having a horizontally disposed tongue on its inside wall and which terminates in a hook-shaped extension, said tongue having a thickness substantially equal to the depth of the sections, whereby in connecting a bail arm with its side arm portion the tongue is located in the groove and the hook-shaped extension engages the respective upstanding ledge, and releasable means extending through the tongue and having connecting relation with the top and bottom sections for locking the parts in assembled relation.

3. In a scraper bucket, in combination, a body member, a digging lip portion along the bottom edge of the body member, a forwardly extending side arm portion on each side of the body member, each side arm portion at its forward terminal end having a horizontal groove in its outer wall, said groove forming top and bottom sections characterizing the terminal end of each side arm portion, and upstanding ledge disposed in the groove at right angles thereto and located adjacent the inner end of the groove, a bail arm for connection with each side arm portion, each bail arm at the terminal end to be connected with a side arm portion having a horizontally disposed tongue on its inside wall and which terminates in a hook-shaped extension, said tongue having a thickness substantially equal to the depth of the sections, whereby in connecting a bail arm with its side arm portion the tongue is located in the groove and the hook-shaped extension engages the respective upstanding ledge, the said top and bottom sections of each arm portion having aligned openings therein disposed at right angles to the groove, the tongue on each bail arm also having an opening therein and so disposed as to align with the openings in said top and bottom sections when the parts are assembled, and releasable means for locking the parts in assembled relation including a wedge member adapted to be inserted in the aligned openings.

4. In a scraper bucket, in combination, a body member providing a digging lip along the bottom edge and having forwardly extending side arm portions in spaced relation, each side arm portion at the forward terminal end thereof having a horizontal groove providing a transversely disposed ledge, a pair of bail arms for the scraper bucket, one being disposed on each side of the body member, each bail arm at its terminal end adjacent the body member having a tongue on its inside wall and which terminates in a hook shaped extension, whereby each bail arm is releasably connected to the body member by locating the tongue in a groove with the hook shaped extension of the tongue in contact with the ledge of the groove, a vertical opening in the forward terminal end of each side arm portion and in each tongue, respectively, and which openings align with each other when the parts are in assembled relation, and a wedge member adapted for insertion in the aligned openings for locking the parts in assembled relation.

5. A scraper bucket as defined by claim 4 additionally including a securing bolt for releasably fastening the wedge member to its respective bail arm.

6. In a scraper bucket, in combination, a body member providing at least one forwardly extending side arm portion, a bail arm portion adapted to be releasably connected to the side arm portion, one of said arm portions having a horizontal groove therein and which terminates at one end in a transversely disposed ledge, the other arm portion providing a horizontally disposed tongue which terminates in a hook-shaped extension, whereby the bail arm portion is releasably connected to said side arm portion by locating the horizontally disposed tongue of one portion in the horizontal groove of the other portion and with the hook-shaped extension in contact with the transversely disposed ledge, vertically aligned openings in said side arm portion and bail arm portion in the vicinity of the groove and tongue respectively, and locking means comprising a wedge adapted to be inserted in the aligned openings for locking the parts in assembled relation.

References Cited in the file of this patent

UNITED STATES PATENTS

| | | |
|---|---|---|
| 348,652 | Anderson | Sept. 7, 1886 |
| 363,109 | Billups | May 17, 1887 |
| 687,835 | Hall | Dec. 3, 1901 |
| 1,065,735 | Sieben et al. | June 24, 1913 |

FOREIGN PATENTS

| | | |
|---|---|---|
| 636,374 | Great Britain | Apr. 26, 1950 |